United States Patent [19]

Stelter

[11] Patent Number: 5,119,930
[45] Date of Patent: Jun. 9, 1992

[54] QUADRANT LOG FEEDER

[76] Inventor: Clifford R. Stelter, 1570 Lookout Point, N. Vancouver, B.C., Canada, V7G 1X9

[21] Appl. No.: 730,282

[22] Filed: Jul. 15, 1991

[51] Int. Cl.⁵ ............................................. B65G 25/00
[52] U.S. Cl. .............................. 198/463.5; 198/463.6; 414/746.2; 414/746.4
[58] Field of Search ............... 198/463.3, 463.5, 463.6; 414/745.9, 746.1, 746.2, 746.4

[56]  References Cited

U.S. PATENT DOCUMENTS

| | | | |
|---|---|---|---|
| 3,700,116 | 10/1972 | Rysti | 414/746.2 |
| 4,245,735 | 1/1981 | Valo | 198/492 |
| 4,624,361 | 11/1986 | Hollins | 198/463.5 |
| 4,662,506 | 5/1987 | Tueckmantel et al. | 198/463.5 |
| 4,852,716 | 8/1989 | Roche | 198/443 |
| 4,911,283 | 3/1990 | Hollins | 198/463.5 |
| 4,930,616 | 6/1990 | Lindberg | 198/463.6 |
| 5,011,024 | 4/1991 | Bunney | 209/517 |

FOREIGN PATENT DOCUMENTS 692593 8/1964 Canada .

Primary Examiner—Joseph E. Valenza
Assistant Examiner—Tuan N. Nguyen
Attorney, Agent, or Firm—Townsend and Townsend

[57] ABSTRACT

An apparatus for sorting and separating logs allows logs to be fed individually for further processing. The log sorter has a rotating quadrant which is covered and has no gaps or apertures that allows logs or branches to become jammed. Furthermore, the rotating quadrant raises the logs above a first holding location. The apparatus includes a movable quadrant with a shelf at a top edge to support at least one log, the movable quadrant moves a log up to a second holding position over a fixed quadrant having radial fins extending through slots in the shelf of the movable quadrant so the fins push a log to the outside of the shelf as the movable quadrant raises it. A transfer feeder comprising a series of rotatable discs with aligned notches, transfers a log from the second holding position to an exit.

12 Claims, 3 Drawing Sheets

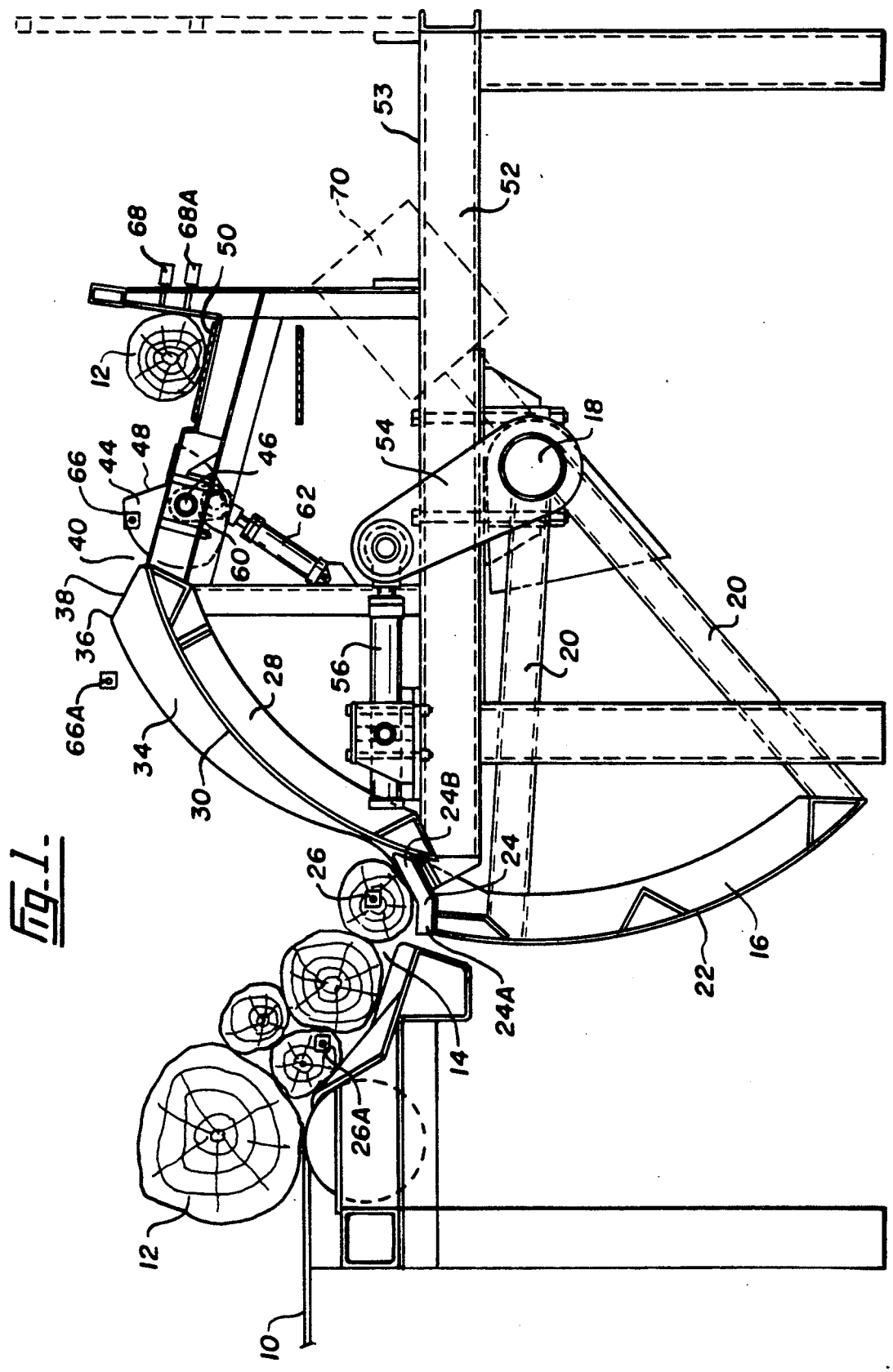

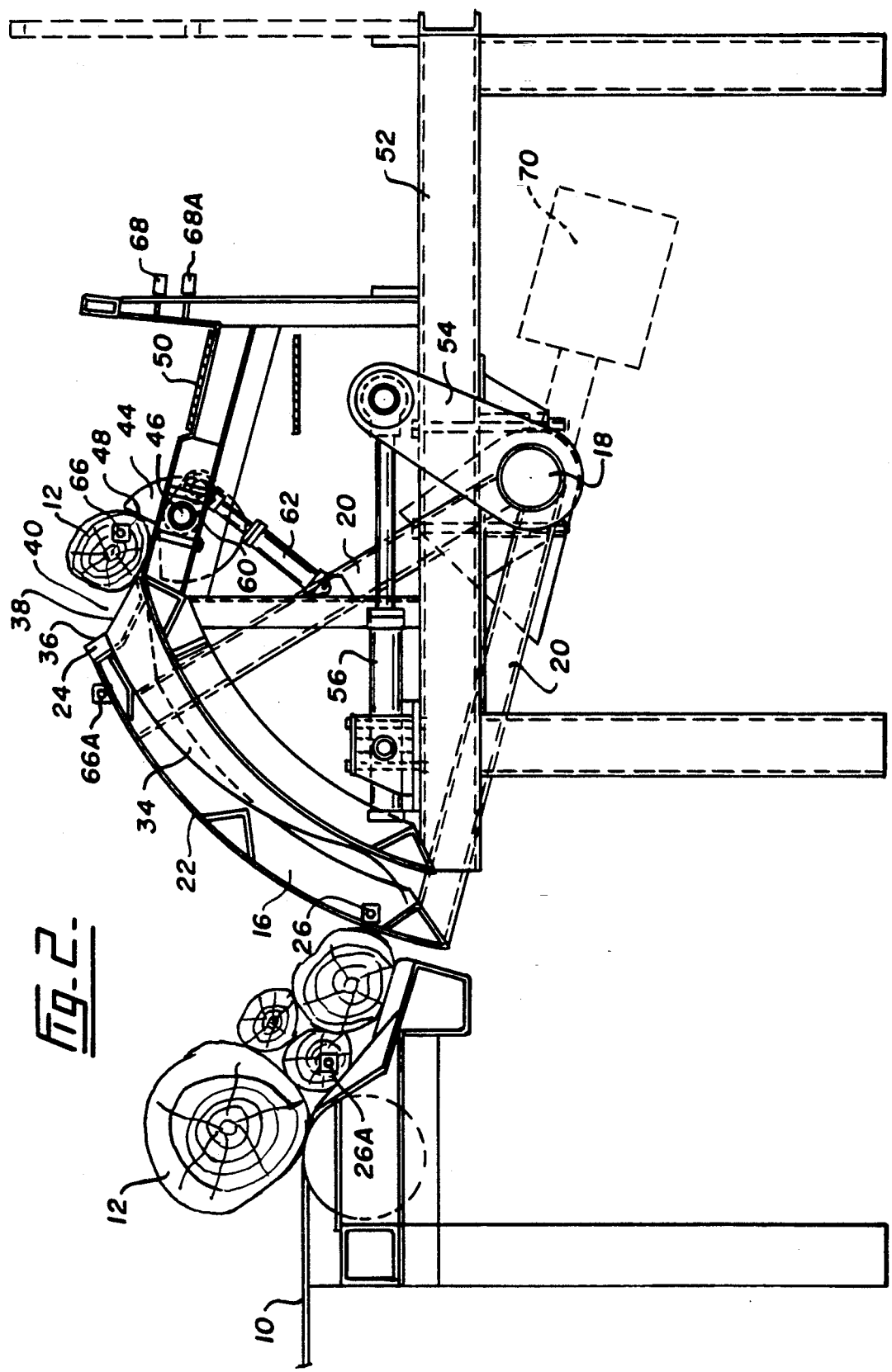

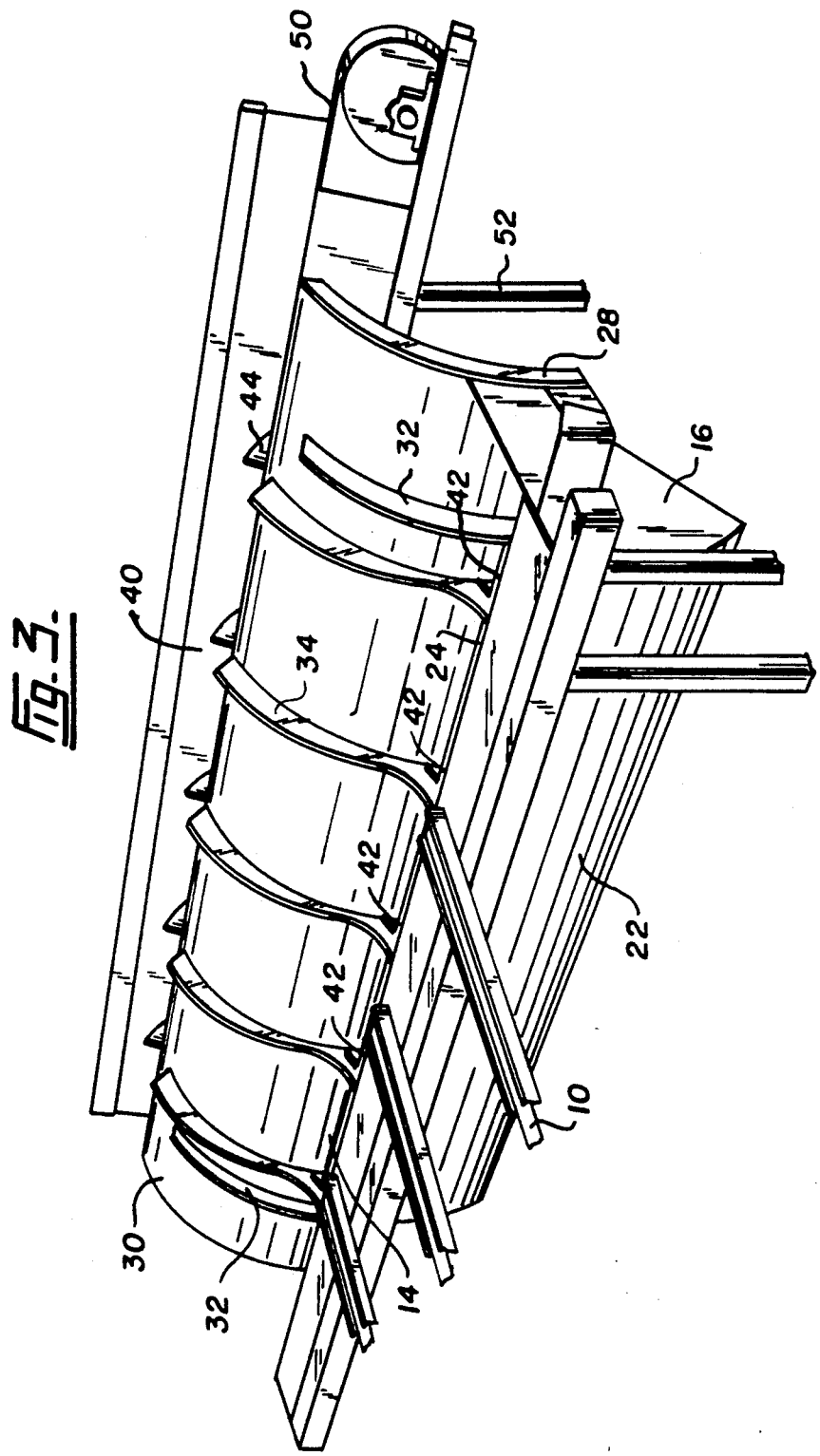

QUADRANT LOG FEEDER

TECHNICAL FIELD

The present invention relates to an apparatus for sorting and separating logs so they may be fed individually for further processing. More particularly, the present invention provides a quadrant log feeder that separates logs of many different sizes and shapes and feeds the logs one at a time for further processing.

BACKGROUND ART

Logs received in a sawmill vary in diameter and length. Some logs are straight, and others are far from straight and have a variety of physical shapes and deformities including taper, flared butts, hooks, crooks, branch stubs, branches, cat faces, splits, and loose bark. In some cases groups of logs are moved on a transverse conveyor sometimes one on top of the other or crossed and tangled in a way that makes them difficult to separate by normal means. Thus, a log sorter is provided so that the logs can be separated and regrouped into smaller groups or moved one at a time on an exit conveyor for grading and subsequent processing.

There are different types of log sorters. Rotary log sorters have drums that rotate with pockets or arms. Most of these rotate continuously and this continuous rotation can present a problem if crossed logs or curved logs are caught in a drum. Examples of such a sorter are U.S. Pat. Nos. 4,852,716 to Roche, and 5,011,024 to Bunney. Other types of log sorters include those which have discs or arms that pick up a log at several positions along its length. Such sorters sometimes have a crooked log or branch caught between the discs and jam-ups can occur in the sorting operation. Step sorters are also available which sort logs in a series of steps. One example of a step sorter is Canadian Patent 692,593 to Nienstedt. Other patents that relate to different types of sorters or singulators are U.S. Pat. Nos. 4,245,735; 4,624,361; 4,911,283 and 4,930,616.

DISCLOSURE OF THE INVENTION

It is an aim of the present invention to provide a log feeder that has a cyclic motion to assist in realigning logs, particularly those that are crossed and are caught up with other logs. Furthermore, it is another aim of the invention to provide a log feeder that can handle logs with a large variation in diameter and logs that are both straight, tapered and crooked.

It is a still further aim of the present invention to provide a log feeder that is adaptable to a fully automatic system and has continuous surfaces across the face to prevent logs or branches being jammed in the apparatus. Furthermore, by providing an apparatus with no apertures or holes in the face of the feeder, refuse does not collect under the apparatus.

It is a further aim of the present invention to provide a log feeder which is less costly and takes up less space than existing log feeders. The feeder of the present invention handles long log lengths and short lengths, and is adaptable for multiple use wherein two or more log feeders can be placed in series with the exit from the first feeder leading to the entrance to the second feeder. Furthermore the output from the log feeder is provided at a higher elevation than a transverse input conveyor which can have advantages in a mill operation. This difference in elevation can be adjusted depending upon the requirements in a mill.

The present invention provides an apparatus for separating logs of varying sizes and feeding logs individually, comprising: a first holding location for receiving logs; a movable quadrant having a shelf at a top edge to support at least one log, the movable quadrant having a curved peripheral surface; means to rotate the movable quadrant from an entry position adjacent the first holding location, adapted to accept at least one log from the first holding location, upwards to an exit position where a log leaves the shelf and moves to a second holding location; a fixed quadrant coaxial with and having a smaller radius than the movable quadrant, the fixed quadrant having a curved peripheral surface and positioned so the movable quadrant rotates and covers the fixed quadrant when moving from the entry position to the exit position; radial fins extending from the surface of the fixed quadrant having an increasing radius from bottom to top of the surface of the fixed quadrant; slots in the shelf of the movable quadrant for the radial fins to pass therethrough and retain one log on the shelf when the movable quadrant rotates to the exit position; in line rotatable discs having aligned notches therein, positioned adjacent the second holding location to receive a log in the notches, and means to rotate the discs to transfer a log from within the notches in the discs to an exit.

BRIEF DESCRIPTION OF THE DRAWINGS

In drawings which illustrate embodiments of the present invention:

FIG. 1 is a schematic side elevational view showing an apparatus for separating logs according to one embodiment of the present invention with the movable quadrant in the entry position.

FIG. 2 is a schematic side elevational view as shown in FIG. 1 with the movable quadrant in the exit position.

FIG. 3 is a schematic isometric view of the apparatus shown in FIGS. 1 and 2.

DESCRIPTION OF THE PREFERRED EMBODIMENT

Referring now to the drawings a transverse entry chain conveyor 10 is shown conveying a plurality of logs 12 having different diameters to form a dam in a first holding location 14 which is just below the elevation of the transverse conveyor 10. A movable quadrant 16 is pivoted about an axial shaft 18 having two arms 20 supporting the quadrant 16. The arms are provided at both ends of the quadrant. The quadrant 16 has a continuous curved plate 22 with no holes or apertures therein to allow debris or logs to project through the quadrant to cause a jam. At the top of the quadrant 16 is a shelf 24 extending for the full length of the quadrant 16. The shelf 24 is in the form of a hook having a short portion 24A adjacent the outside surface of the quadrant 16 being substantially horizontal, and the longer portion 24B being sloped upwards. The purpose of the shelf 24 will be explained hereafter.

FIG. 1 illustrates the quadrant 16 shown in what is referred to as the entry position so that logs from the first holding location 14 fall onto the shelf 24. Initially one or more logs may fall onto the shelf 24. If a dam of logs builds up so that it crosses lines from optical detectors 26 and 26A, such as photoelectric cells, then the transverse conveyor 10 stops.

A fixed quadrant 28 coaxial with the movable quadrant 16 is positioned above the movable quadrant 16 and has a smaller radius than the movable quadrant 16. The fixed quadrant 28 has a peripheral curved surface plate 30 which extends from end to end of the quadrant 28. Slots 32 shown more clearly in FIG. 3 are provided towards the ends of the fixed quadrant 28 for the arms 20 of the movable quadrant to pass therethrough.

A plurality of radial ribs 34 shown more clearly in FIG. 3, extend up from the surface plate 30 of the fixed quadrant 2,8. The radial ribs 34 are shown at the base to have substantially the same slope as the shelf 24, reduce in radius and then slowly increase up the fixed quadrant 28 to a top peak 36 followed by end sloped portions 38 downwards to a second holding location 40. As shown in FIG. 3, slots 42 are provided in the shelf 24 for the ribs 34 to pass through when the movable quadrant 16 moves to the exit position.

FIG. 2 illustrates the movable quadrant 16 moved from an entry position as shown in FIG. 1 to an exit position so that the shelf 24 terminates being substantially parallel to the end sloped portions 38 of the ribs 34.

A series of rotating discs 44 mounted on rotating shaft 46 are positioned beside the second holding location 40 and have notches 48 aligned up in each disc positioned as shown in FIG. 2 so that a log 12 rests in the notches 48 when in the second holding location 40. The discs 44 rotate to an exit position as shown in FIG. 1 and the log 10 rolls down onto an exit conveyor 50 which moves a single log away.

The apparatus is mounted on a frame 52 having a walkway 53 adjacent the exit conveyor 50. As seen, the exit conveyor 50 is higher than the transverse conveyor 10 so that the departing log is at a higher elevation than the logs entering the separator. The shaft 18 supporting the movable quadrant 16 has an arm 54 keyed thereto and a pneumatic or hydraulic cylinder 56 is attached to the end of the arm 54 and when in the extended position as shown in FIG. 2, moves the quadrant 16 to the exit position and when in the retracted position as shown in FIG. 1, moves the quadrant to the entry position. One cylinder 56 only is generally sufficient to move the quadrant 16.

The discs 44 have an offset arm 60 with a cylinder 62 attached thereto. The cylinder may be hydraulic or pneumatic and when extended is shown in the position of FIG. 2 to receive a log in the second holding location 40 and when retracted rotates the log 12 to allow it to roll or slide onto the output conveyor 50.

As shown in FIG. 1, optical detectors 66 and 66A are positioned at the second holding location 40 and above the fins 34 close to the top peak 36 to ensure that the movable quadrant 16 does not move upwards until a log or logs in the second holding location 40 has been moved. Furthermore, another photoelectric cell 68 is positioned over the output conveyor 50 to ensure that the discs 44 are not rotated when there is still an existing log or logs on the conveyor 50.

In operation, the photoelectric cell 66 indicates there is no log positioned in the second holding location 40, therefore, the cylinder 56 commences to move the quadrant 16 up from the entry position. One or more logs may rest on the shelf 24 and as the quadrant moves up, the ribs 34 pass through the slots 42 in the shelf 24. The log 12 slowly rotates on the ribs which also push the log out as the shelf moves out. Although the useful width of the shelf 24 is reduced because the ribs 34 increase in radius, the center of gravity of the log changes as it moves up the circular path, and thus prevents the log from falling off the shelf 24 while sorting other logs and allowing them to fall back into the first holding location 14. If there are several logs on the shelf all but one log or one small group of logs fall back into the first holding location 14. Furthermore, if logs are crossed or crooked, they too tend to rotate on the ribs 34 and are pushed outwards as the width of the shelf is reduced by the ribs 34. Thus when the shelf 24 reaches the exit position, only one log 12 or one single layer of logs remain on the shelf and it rolls down the sloped portions 38 of the ribs 34 into the second holding location 40, as shown in FIG. 2. The discs 44 then rotate, the log 12 is held in the notches 48 of the discs 44 and the log is deposited to roll or slide down onto the output conveyor 50 for conveyance away from the separator.

As the movable quadrant 16 moves up, the continuous curved plate 22 contains logs in the dam of the first holding location 14. The logs 12 may rotate, particularly if the log has a rough surface and this tends to untangle logs. Debris does not fall into the quadrant mechanism as there are no apertures or holes in the plate 22.

The equipment utilizes the center of gravity of the largest logs that may occur for placements of combinations of smaller logs to produce a profile for the top of the movable quadrant 16 adjacent to the fixed quadrant 28 so that only one log of larger diameter or small groups of logs of smaller diameters are elevated by the shelf 24.

Whereas one separator is shown herein, a second separator may be mounted so that the first holding location 14 for the second separator replaces the output conveyor 50 on the first separator and raises the logs to a higher elevation while contributing to further separation. This is particularly applicable for a large range of diameters. Furthermore, it raises the elevation of the output conveyor 50 which is desirable in certain mills. The dimensions of the separators may be changed to suit the sizes of logs to be handled and the separation requirements.

When the movable quadrant 16 returns to the entry position, the curved plate 22 of the movable quadrant 16 does not allow logs already in the first holding location 14 to jam. As soon as the shelf 24 has returned to the entry position, another log moves onto the shelf 24.

In another embodiment a counter weight 70, as shown in dotted line in FIG. 1, is provided on an extension of arm or arms 20 reduces the force necessary to move the quadrant 16. A double acting cylinder 56 is provided so pressure may be provided on both sides of a piston to both raise and lower the quadrant and rectify a portion of the live load. Whereas a counter weight 70 is shown herein this may be replaced by a spring, air bag or other suitable mechanisms.

Various changes may be made to the embodiments shown herein without departing from the scope of the present invention which is limited only by the following claims.

The embodiments of the present invention in which an exclusive property or privilege is claimed are defined as follows:

1. An apparatus for separating logs of varying sizes and feeding logs individually, comprising:
    a first holding location for receiving logs;

a movable quadrant having a shelf at a top edge to support at least one log, the movable quadrant having a curved peripheral surface;

means to rotate the movable quadrant from an entry position adjacent the first holding location, adapted to accept at least one log from the first holding location, upwards to an exit position where a log leaves the shelf and moves to a second holding location;

a fixed quadrant coaxial with and having a smaller radius than the movable quadrant, the fixed quadrant having a curved peripheral surface and positioned so the movable quadrant rotates and covers the fixed quadrant when moving from the entry position to the exit position;

radial fins extending from the surface of the fixed quadrant having an increasing radius from bottom to top of the surface of the fixed quadrant;

slots in the shelf of the movable quadrant for the radial fins to pass therethrough and retain one log on the shelf when the movable quadrant rotates to the exit position;

in line rotatable discs having aligned notches therein positioned adjacent the second holding location to receive a log in the notches, and means to rotate the discs to transfer a log from within the notches in the discs to an exit.

2. The apparatus for separating logs according to claim 1 wherein the discs transfer a log in the notches to an exit conveyor means positioned at a higher elevation than the transverse conveyor means.

3. The apparatus for separating logs according to claim 1 wherein the movable quadrant is rotated through an angle in the range of about 45° to 70° when moved from the entry position to the exit position.

4. The apparatus for separating logs according to claim 3 wherein the radial fins are sloped at the top to guide a log from the exit position on the shelf to the second holding location.

5. The apparatus for separating logs according to claim 1 wherein the curved peripheral surfaces of the movable quadrant and the fixed quadrant are formed of curved sheet steel.

6. The apparatus for separating logs according to claim 1 wherein the shelf of the movable quadrant has an upward sloping portion towards the fixed quadrant surface and a shorter portion towards the edge of the movable quadrant surface to form a hook configuration.

7. The apparatus for separating logs according to claim 6 wherein the hook configuration of the shelf extends for the length of the movable quadrant.

8. The apparatus for separating logs according to claim 1 including a plurality of optical detectors positioned to detect logs in the first holding location, and in the second holding location.

9. The apparatus for separating logs according to claim 1 wherein at least two apparatus for separating logs are provided with the exit from the first apparatus leading to the first holding location of the second apparatus, and wherein the second apparatus is at a higher elevation than the first apparatus.

10. The apparatus for separating logs according to claim 1 wherein the means to rotate the movable quadrant comprises a hydraulic or pneumatic cylinder operating in one stroke to move from the entry position to the exit position and reverse the positions in the other stroke.

11. The apparatus for separating logs according to claim 1 wherein the means to rotate the discs to transfer a log comprises a hydraulic or pneumatic cylinder.

12. The apparatus for separating logs according to claim 10 wherein the means to rotate the movable quadrant includes a counter balance force.

* * * * *